United States Patent [19]
Kuehnel et al.

[11] Patent Number: 5,787,077
[45] Date of Patent: Jul. 28, 1998

[54] DYNAMIC CONNECTION MAPPING IN WIRELESS ATM SYSTEMS

[75] Inventors: Thomas Kuehnel, Bern; Yung-Shain Wu, Studen, both of Switzerland

[73] Assignee: ASCOM Tech AG, Bern, Switzerland

[21] Appl. No.: 658,231

[22] Filed: Jun. 4, 1996

[51] Int. Cl.$^6$ .............................. H04L 12/56; H04L 12/66
[52] U.S. Cl. ........................ 370/331; 370/397; 370/524
[58] Field of Search ................................ 370/395, 397, 370/338, 331, 332, 333, 328, 329, 277, 384, 522, 524, 399, 389; 455/436, 437, 440, 443

[56] References Cited

U.S. PATENT DOCUMENTS

| | | | |
|---|---|---|---|
| 5,359,603 | 10/1994 | McTiffin | 370/399 |
| 5,406,550 | 4/1995 | McTiffin | 370/395 |
| 5,438,565 | 8/1995 | Hemmady et al. | 370/395 |
| 5,487,065 | 1/1996 | Acampora et al. | 370/397 |
| 5,553,069 | 9/1996 | Ueno et al. | 370/395 |
| 5,600,633 | 2/1997 | Jaisingh et al. | 370/395 |

FOREIGN PATENT DOCUMENTS 0577959  1/1994  European Pat. Off. .

OTHER PUBLICATIONS

K.Y. Eng et al.; *BAHAMA: A Broadband Ad–Hoc Wireless ATM Local–Area Network*; Jun. 18, 1995; pp. 1216–1223.
Anthony S. Acampora; *An Architecture and Methodology for Mobile–Executed Handoff in Cellular ATM Networks*; Oct. 12, 1994; pp. 1365–1375.
Prathima Agrawal et al.; *Network Architecture for Mobile and Wireless ATM*; May 27, 1996; pp. 299–310.

*Primary Examiner*—Chau Nguyen

[57] ABSTRACT

A wireless communication system for asynchronous transfer mode includes the dynamic mapping of ATM cells on a wireless ATM link into a unique Virtual Path on a wired ATM link, and in the reverse direction as well. The access point includes a radio medium access controller which assigns a unique radio connection identifier RCI to the wireless link established between the access point and a mobile terminal. The Virtual Path identifier (VPI) used on the fixed link is selected based on the RCI assigned by the access point. The radio connection identifier RCI remains unchanged as long as the mobile terminal is associated with that access point. ATM cells sent from the control function include the VPI and are mapped by the access point into the connection referenced by the RCI. ATM cells from the mobile terminal are received on a particular connection. According to the connection identifier (RCI) cells are mapped by the access point into a particular Virtual Path, which corresponds to the RCI.

14 Claims, 4 Drawing Sheets

DYNAMIC CONNECTION MAPPING IN WIRELESS ATM SYSTEMS

TECHNICAL FIELD OF THE INVENTION

The present invention relates to telecommunication networks and in particular to wireless (mobile) telecommunication systems using asynchronous transfer mode (ATM) technology. The invention is applicable for the interworking of wireless and wired ATM networks.

BACKGROUND OF THE INVENTION

In recent years, two major developments have been affecting telecommunications technology: broadband communication and mobile communication.

Broadband communication is mainly driven by new multimedia services which require more bandwidth than can be offered by existing network solutions.

ATM (Asynchronous Transfer Mode) is considered the major technology for future development of Broadband Integrated Services Digital Networks (B-ISDN). Standards supported by the International Telecommunications Union as well as the ATM Forum are evolving to allow seamless interworking of equipment and networks which are manufactured and operated by different organizations. The intent behind using ATM is also to create a single network that is able to handle different kinds of telecommunications traffic, including video, data and audio.

An ATM transport network (i.e., a communication network which transmits information using ATM cell packets) is known to include an ATM layer and a physical layer. The ATM layer is based on the virtual path identifier/virtual channel identifier (VPI/VCI) concept. The VC represents a unidirectional communication capability through which ATM cells are transported. One or more VCs can be used in a particular virtual path (VP), which also (in general) identifies another level of the communication capability through which the ATM cells are transported.

An ATM cell (as the smallest information unit) includes a header field (5 bytes or octets) and a payload field (48 bytes or octets). As shown in FIG. 1, the ATM cell header contains, among other information, the VP and VC identifier(s) used for addressing inside the network (i.e., for routing the information to an intended destination).

Communication in known ATM networks is initiated during a connection setup, after which cells belonging to one connection follow a predetermined path defined by the VPI and VCI on a particular link. The connection control information is transferred during setup using a unique Signalling VC (SVC) which is contained in the VP used. It is identified by the pair: virtual path ID (VPI) and virtual channel ID (VCI). The physical layer provides a reliable continuous physical (hardwired) connection between ports of the user side and of the network side.

Mobile communication via wireless interface has gained significant importance for voice and data transmission. Cellular architecture, with its limited coverage areas for each radio cell, allows frequency reuse and therefore accommodates a large number of mobile users. These radio cells can be located statically based on fixed access points using ground-mounted stations or geostationary satellites. The radio cells can also be located dynamically using non-fixed access points such as low earth orbit satellites, for example. To allow mobility of the mobile terminals across the borders of adjacent radio cells, systems typically provide special mechanisms for handover, new registration, and connection-loss.

Known cellular wireless networks have a controller, a plurality of access points, and mobile terminals. The control function, which can be implemented in a central device such as controller or distributed among the access points, handles the mobility specific functions (such as when mobile terminals cross into new radio cells) and call control functions for calls originating and terminating at the mobile terminals. The control function also manages the radio resources of its associated access points, is a signalling point for bearer control, and forms the interface to an external network.

As the mobile terminals move across the radio cell boundaries, ongoing communications continue without impacting the telecommunications connection. Mechanisms for registration of a new mobile terminal, handover of an existing mobile terminal, and loss of connection with a mobile terminal, are all provided. However, the wireless communication connection between the mobile terminal and the controller must be processed (i.e. translated) at the access points. The controller must rely on the access points to perform the necessary translations for information passing to/from the mobile terminals. Therefore, the access points require complex processing hardware and software. The result is a costly access point, both in terms of cost and processing time.

In wireless networks, it is known to use electromagnetic (radio or optical) links between mobile terminals and the network. These electromagnetic links are less reliable than fixed (hardwired) network links. The area of the wireless network is typically split into radio cells in order to increase the total capacity of the network and the reduce transmission power. Adjacent radio cells use different frequency domains. Each radio cell is controlled by an access point which typically includes a radio access controller responsible for monitoring the electromagnetic transmissions in its access point's frequency domain. One or more access points are controlled by the system controller.

Current telephone networks use synchronous transfer modes in which timeslots are specifically reserved in constant intervals, i.e. transmitter and receiver are synchronized to detect the selected timeslot.

Due to the limited bandwidth in current wireless systems, e.g., GSM, the ability of known systems to handle future bandwidth intensive services is limited as well. Network proposals which offer higher bandwidth lack the interoperability with the future B-ISDN.

The present invention therefore desires to combine both technological directions: ATM and wireless networking. The major hurdle for an integrated solution is that ATM is designed primarily for wired networks. Adaptation of the virtual channel/virtual path (VC/VP) concept, which is inherent in ATM, to the wireless environment is one of the major problems that the present invention attempts to solve. In particular, the present invention addresses problems caused by sharing the air interface, which is something ATM was not designed for.

Accordingly, it is one object of the present invention to provide a mechanism for mapping ATM cells from a particular radio connection into a unique Virtual Path.

SUMMARY OF THE INVENTION

It is an object of the present invention to provide a digital communication system providing wireless access to an ATM environment, comprising a controller for, controlling ATM communications; a first mobile terminal having a wireless communication interface; at least one access point covering wireless communications within a geographical area, for facilitating communication between said controller and said first mobile terminal when said first mobile terminal is located within the geographical area, said access point including a wireless access part for establishing a wireless connection with the wireless communication interface of said first mobile terminal, an interface part operatively connected to said controller through a respective fixed link, and a mapping unit for mapping ATM cells received on the wireless access part into a selected virtual path on the respective fixed link to said controller, and for mapping ATM cells received on the selected virtual path of the respective fixed link into the wireless connection to said first mobile terminal. An inventive method is also provided.

The objects of the present invention are fulfilled by providing a mechanism applicable to wireless ATM networks, which provides for mapping of ATM cells conveyed on a particular radio connection between a mobile terminal and an access point into a unique Virtual Path. The mapping is performed in a reverse direction as well, i.e. from VP to radio connection. Different virtual paths are used at the fixed network in order to distinguish different mobile terminals. The radio connection conveys data that may belong to different logical connections characterized by different virtual channels. These virtual channels are directly mapped into the virtual path without changing the Virtual Channells Identifiers (VCI). A default Signaling Virtual Channel (SVC) may be reserved for signaling purposes in each virtual path.

The present invention allows the access points to be transparent for the telecommunications traffic; no translation needs to be performed at the access points.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
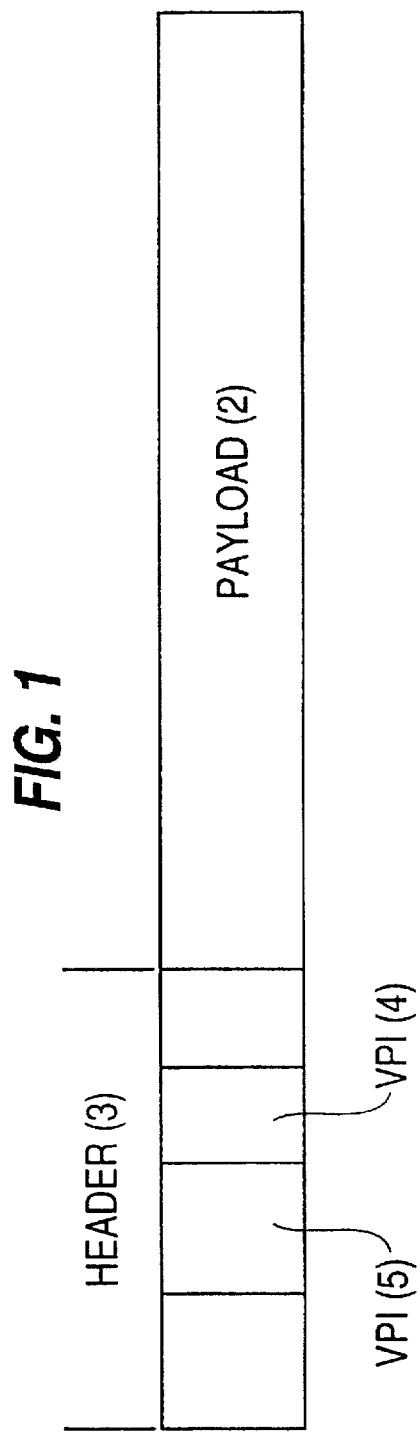
FIG. 1 illustrates a conventional ATM cell.

The key to widespread implementation of a wireless ATM network is believed to be the cost efficiency of the system's infrastructure, and its transmission efficiency for the scarce resource of over-the-air interfaces. Cost efficiency includes both monetary and processing-time considerations. In a pico cell environment, the major infrastructure costs are hidden in the access points (AP) of the wireless network, which are necessary for each radio cell. By providing a system having inexpensive and reliable infrastructure, with simplified access points, the present invention clears these key obstacles.

In wireless communication systems, the efficiency with which available bandwidth is used at the over-the-air interfaces depends on the overhead and the protocol and modulation schemes used. The architecture of the present invention is independent of the system's radio protocol and modulation scheme used, and therefore places no restriction on them (except for the provision of a unique identifier for each radio connection).

The access point of the present invention preferably includes a Radio Medium Access Control (RMAC) layer. When a mobile terminal attempts to become associated with the access point (i.e., when the radio link is being set up), the RMAC assigns a Radio Connection Identifier (RCI) to the mobile terminal depending on the available radio channel in a FDMA (Frequency Division Multiplex Access), slot number in a TDMA (Time Division Multiplex Access), or Coding key in a CDMA (Code Division Multiplex Access) System, for example. The RCI for that mobile terminal connection remains constant for the duration of the association between the mobile terminal and the access point. That is, as long as the mobile terminal stays in the cell and keeps the radio connection with the access point, the RCI for that mobile terminal remains unchanged.

The Virtual Path Identifier (VPI) is derived directly from the RCI. Preferably, the VPI is identical with the RCI. However, it is possible to have other one-to-one relationships between an assigned RCI and the derived VPI. The unique Virtual Path (VP) is then used for mapping (in both directions) ATM cells conveyed on the particular radio connection between the mobile terminal and the control function. Cells going to the mobile terminal are separated from other cells by the access point.

The mobile terminal may have more than one logical connection with the control function (e.g. different application programs being executed at once, such as a control application and a user application). In this case, the different logical connections may be conveyed on the same radio connection using different Virtual Channels (VCs). These VCs are directly mapped into the Virtual Path without change. Because, hierarchically, the Virtual Path is higher than the Virtual Channel, a change in the virtual path identifier (VPI) takes with it all of the virtual channels contained therein.

In the case of new Registration to the system, or handover from one access point to another access point, a new VPI is selected based on the new RCI of the new radio connection. If the radio connection is broken, the RCI is released and ongoing calls are cleared. the released RCI can be assigned to another mobile terminal.

Due to the direct translation of RCI into VPI, the present invention requires no table updates. To allow the control function to perform the assignment of the VPI to a particular mobile terminal, a unique reference for the mobile terminal, e.g. the ATM address of the mobile terminal, is conveyed to the control function after the radio link has been established. A VPI on a particular link between the access point and the control function corresponds to a single mobile terminal for the duration of the association between the mobile terminal and the access point. Handover, as explained in more detail below, is performed by switching the virtual path according to the assigned RCI. No individual translations are needed for individual Virtual Channels.

A Signalling Virtual Channel (SVC) may be used as a control path between the mobile terminal and the control function. This signalling channel is used for further communication between the mobile terminal and the controller. These communications might be specifically for control purposes such as signalling for call control and mobility management. The present invention controls the assignment of the virtual path identifier/virtual channel identifier (VPI/VCI) in an efficient way. Different approaches are contemplated.

A first approach contemplated by the present invention is to set up a unique control channel between a mobile terminal and the control function using a metasignalling protocol. Based on this control channel, signalling takes place, i.e., signalling for setting up a data connection using a unique VPI/VCI combination for the entire connection from the mobile terminal to the control function.

Another option is to use a predefined VPI/VCI on the wireless interface, such that each mobile terminal in the system utilizes the same VPI/VCI. The VPI/VCI would then be translated at the access point for the fixed network into different VPI/VCI pairs. A further possibility is to multiplex messages received from different mobile terminals into differentiable Protocol Data Units (PDUs) of higher layers.

Metasignalling requires additional protocol entities and a Medium Access Control with broadcast capabilities. The translation option necessitates the translation of all VPI/VCI pairs from the wireless side into VPI/VCI pairs at the fixed network. This further requires a translation table which has to be updated whenever a new registration or handover is carried out. The conversion table is also required for translating information headed in the reverse direction. The drawback of multiplexing is the high protocol overhead resulting in high delay and overall complexity. If only certain data types are multiplexed, e.g., signalling data, then filtering is needed as well.

Because each of these options includes significant costs (both in monetary and processing terms), the present invention prefers a fourth option, in which a virtual path identifier (VPI) is used between the control function and the access point. The VPI is based on the Radio Control Identifier (RCI) assigned by the access point to the mobile terminal upon its association with the access point. By selecting a VPI in direct correspondence with the RCI, a simplified system is obtained.

After a mobile terminal becomes associated with an access point, the present invention preferably employs the dynamic assignment of a connection between a given mobile terminal and the control function. This leaves the access points transparent for the transmission of data and control information.

In the present invention, a connection between the system's controller (or "control function") and a mobile terminal is defined by the information (VPI, VCI, port#). VCI and VPI are the Virtual Channel Identifier(s) and Virtual Path Identifier(s), respectively. The port number simply identifies a physical link, e.g. the input/output port through which the controller sends information to a desired access point, this access point being the one associated through the wireless connection to the mobile terminal. Network elements perform the actual routing of the information once inside the network (i.e. inside the controller and beyond), in a manner known to those skilled in the art.

The port number is not known (and is generally irrelevant) to the mobile terminal. On the wireless side, the inventive access point merges the up-link traffic onto a fixed link to the controller, and likewise splits downlink traffic to their respective mobile terminals. Since the port number is not included in the information travelling over the air (between the access point and the mobile terminal), there arises the possibility of multiple assignment of the same VPI/VCI values to different connections. Avoiding assignment conflicts for multiple connections is crucial in the following cases:

(1) registration: a mobile terminal enters a coverage area (radio cell) of an access point AP, or a new mobile terminal is switched "ON".

(2) handover: a mobile terminal moves from one radio cell to another radio cell.

(3) loss of carrier: the connection breaks between the mobile terminal and the access point, or the mobile terminal is switched "OFF".

Each of these cases will be discussed individually in detail. However, for the purposes of simplifying discussion, it may be assumed that the connection between the access point and the control function has already been activated.

Figure 2:
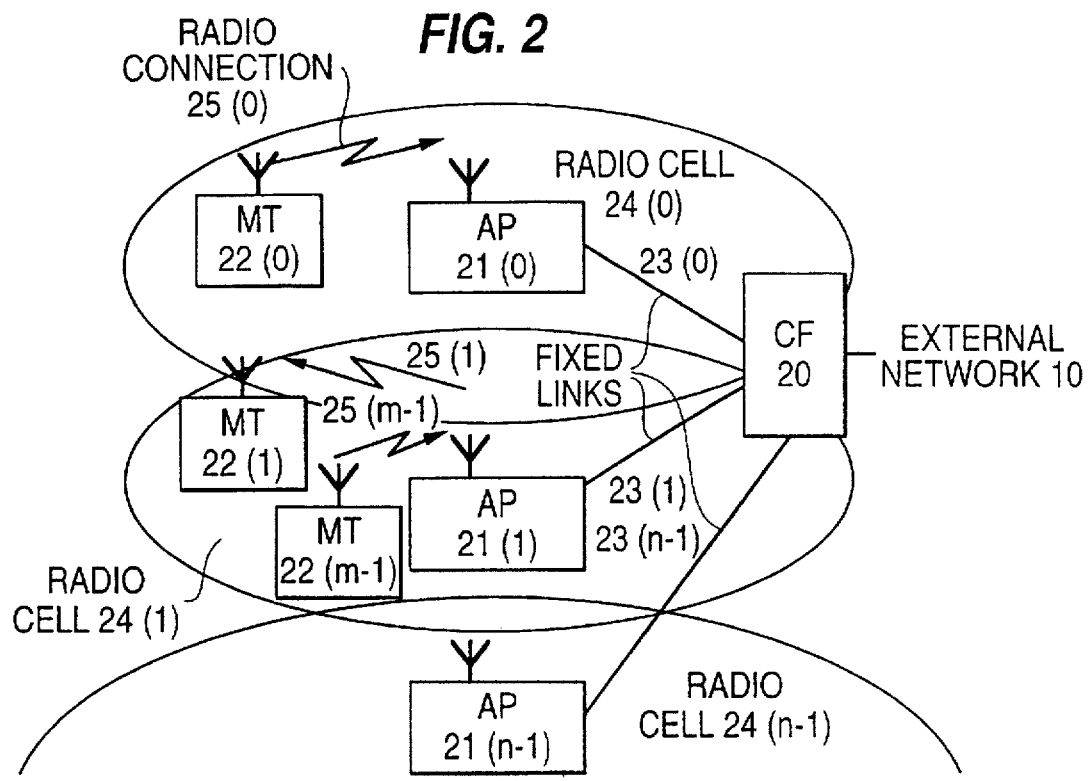
FIG. 2 shows a wireless network according to one preferred embodiment of the present invention.

Registration. Referring to FIG. 2, in the coverage area of an access point 21, a mobile terminal 22 is switched "ON" or enters a cell without prior radio connection to another access point. An association procedure takes place between the mobile terminal 22 and the access point 21 establishing a wireless link, in a manner known in the art. Once the radio link is established, signalling and control data can be exchanged between the mobile terminal 22 and the control function 20 using a predefined (default) VC.

Figure 6:
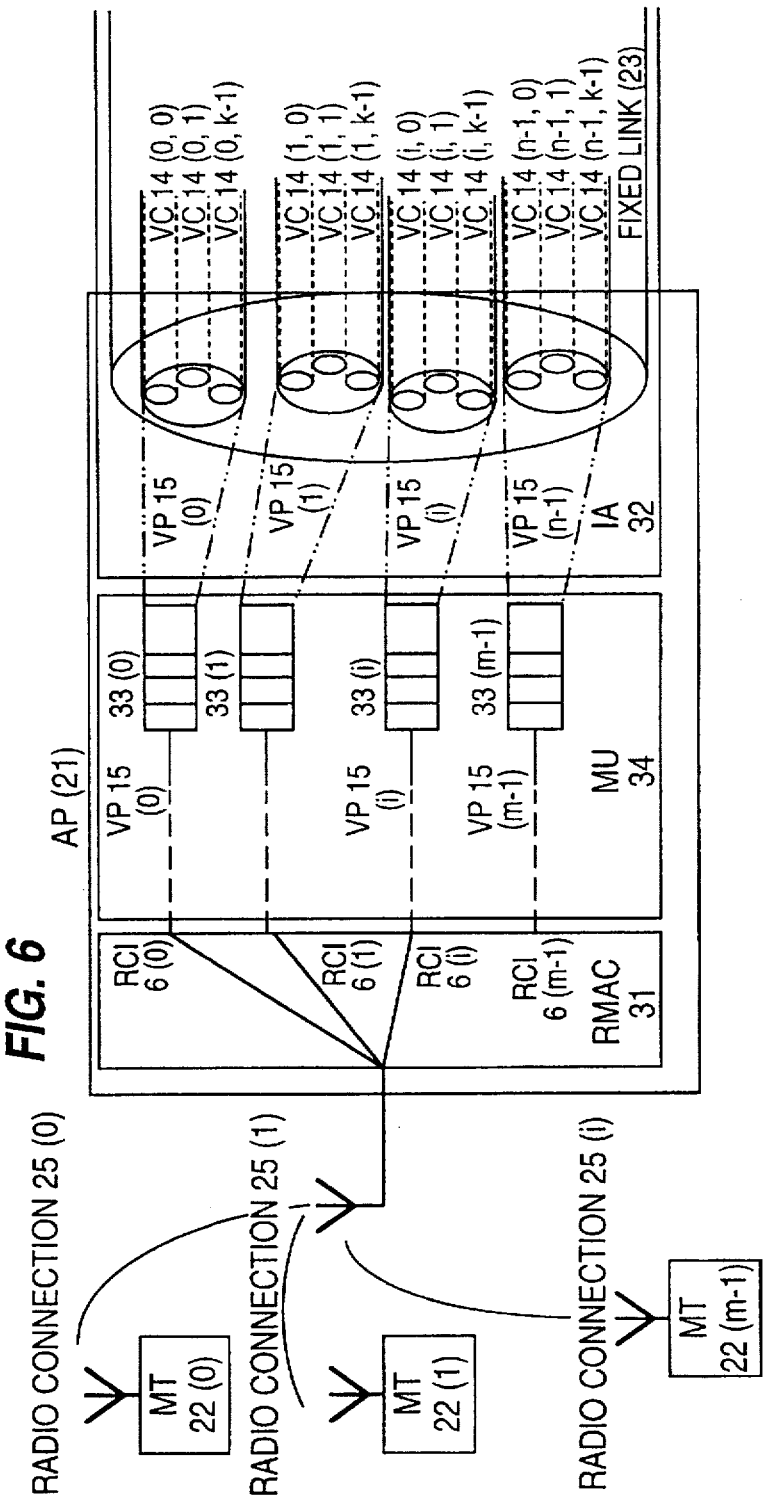
FIG. 6 shows the access point and its interconnections, according to one preferred embodiment of the present invention.

That is to say, when the radio link between the mobile terminal 22 and the access point 21 is established, the mobile terminal 22 and the access point 21 become "associated," and the radio connection to the particular mobile terminal 22 is uniquely referenced inside the access point 21 by the radio connection identifier 6 (FIG. 6). This radio connection identifier 6 is assigned by the radio medium access control 31 during association. All virtual channels 14 belonging to the mobile terminal 22, including the signalling virtual channel, are transmitted on the established radio connection which is referenced by the radio connection identifier 6. The radio connection acts in this case similar to a virtual path as a conduit for all logical connections (VCs) from a particular mobile terminal 22. It is assumed that the radio medium access control (RMAC) 31 includes means to provide a radio connection identifier 6 to uniquely identify a particular radio connection. In this regard, suitable RMAC design is known to those skilled in the art, and need not be further discussed herein.

The access point 21 maps, based on the radio connection identifier 6, all virtual channels conveyed on a particular radio link, including the signalling connection, directly into a virtual path 15. In the reverse direction, all virtual channels 14 carried in one virtual path 15 are mapped directly into the corresponding radio connection which is identified by the radio connection identifier 6. There is a one-to-one relationship between virtual path identifier 5 and radio connection identifier 6. This implicit mapping between virtual path identifier 5 and radio connection identifier 6 allows the transfer of data between the mobile terminal 22 and the control function 20 once the association is completed.

The newly established radio link to a particular mobile terminal 22 is, at the access point, directly mapped into a unique signalling virtual path. Subsequently, all logic connections including the default signalling connection, are mapped from the radio link to a virtual path and vice-versa.

Figure 4:
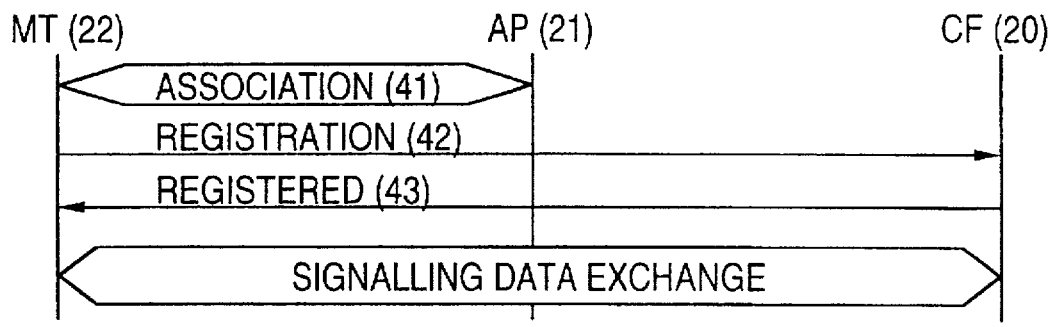
FIG. 4 illustrates the flow of messages between the controller and a mobile terminal during registration, according to one preferred embodiment of the present invention.

FIG. 4 illustrates the sequence of messages exchanged during the registration process. The mobile terminal 22 requests, after association with the access point, to be registered at the control function. This request is done using a default signaling channel. As part of the registration request, a unique identification number of the mobile terminal must be included. In the return message from the control function, the request may be granted if resources are available.

The access point 21 maps the address field of the cells containing signaling data which are received from the mobile terminal 22 into a unique VPI/VCI based on the radio connection identifier (RCI) 6 provided by the Radio Medium Access Control (RMAC) layer of the access point for each received cell. The VCI is equivalent to the VCI of the ATM cells received. The access point 21 forwards the ATM cells containing the new VPI to the control function 20. The VPI corresponds directly to the RCI.

Signaling uses a predefined VCI in each virtual path, e.g. VCI=5. Based on the mobile terminal's I.D. and the VPI on which the registration message was conveyed, the control function 20 relates a new VPI to the requesting mobile terminal 22. The "Registered" message conveyed from the control function 20 to the mobile terminal 22 (FIG. 4) is sent by the control function 22 using the same VPI used by the mobile terminal when requesting registration. The VCI field used for the "Registered" message 43 is predefined, e.g. VCI=5.

At the access point 21, the VPI field of the received ATM cell acts as a connection identifier of the radio link. It is mapped into the RCI. The ATM cells are sent according to the RCI to the requesting mobile terminal 22.

This registration phase may include the verification and/or exchange of security keys for ciphering of data. After successful registration, signaling between the mobile terminal 22 and the control function 20 for connection set up, etc., can take place.

The transmission of the Registration Request by the mobile terminal is preferably done using a predetermined VCI. The mobile terminal is preferably provided with a microprocessor (or other analogous control element, including a finite state machine) and a memory for storing ATM cells that have been received or cells which should be transmitted on a wireless link.

As stated above, the registration of the mobile terminal may be combined with authentication and accounting. A specific identifier for the mobile terminal, e.g., a mobile terminal ID may be transmitted along with a security key as part of the Registration Request message. The security key can be used for ciphering and deciphering future information exchanges via the radio interface, thereby improving security of the connection.

Handover. Handover takes place when a mobile terminal 22 is moving from one radio cell to another radio cell, and depends on signal strength (or other factors known in the art) at the mobile terminal or at the access point 21. Referring to FIG. 2, handover may occur when mobile terminal 22(1) moves from radio cell 24(1) to radio cell 24(0). FIG. 2 shows "n" radio cells. We assume for simplicity that the handover is initiated by the mobile terminal.

Figure 5:
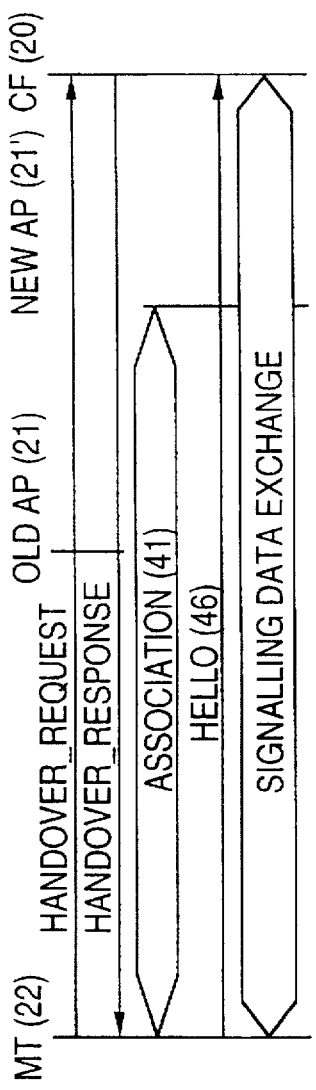
FIG. 5 illustrates the flow of messages during handover.

FIG. 5 shows the data flow between a mobile terminal, the access point, and the control function during handover. The mobile terminal 22 sends a handover request to the control function 20 requesting handover to another (new) access point 21' by using the old radio connection. If resources are available, the request is granted in the control function's Handover Response. The mobile terminal 22 switches its radio connection to the new access point 21' as follows.

Figure 3:
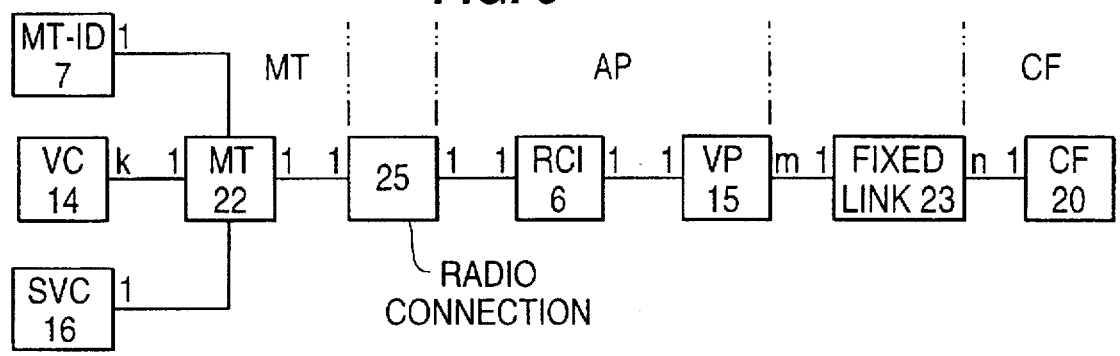
FIG. 3 illustrates the communication relationships between certain entities involved in a preferred embodiment of the present invention.

Upon successful association between the new access point 21' and the mobile terminal 22, the new access point 21' provides the new radio connection identifier for the radio connection. All virtual channels 14 belonging to this new radio connection, including the signalling virtual channel 16, are mapped inside the new access point 21' into one virtual path 15. The new VPI 5 and the new RCI 6 correspond with one another, preferably by being identical. However, other one-to-one relationships are also possible as discussed elsewhere in this disclosure. To inform the control function 20 of the successful handover and to allow the control function 20 to determine the new VPI that the mobile terminal has been associated with, the following steps are taken:

After the association between the mobile terminal and the new access point 21' has been completed, the mobile terminal 22 sends a "hello" message 46 containing its unique mobile terminal ID. The "hello" message 46 is transmitted using a predefined VCI 4. Due to the mapping of all virtual channels 14 belonging to a particular radio connection into a virtual path 15 which is derived from the new RCI 6, the VCIs 4 are retained on the fixed link 23 connecting the access point and the control function. The "hello" message sent to the control function 20 confirms the performed handover. A renegotiation of QoS (Quality of Service) parameters may take place if the resources for the new access point 21' are limited. QoS parameters are known in the art, and may include bandwidth, bit rate, time domain provisions (e.g., maximum delay permitted), etc. Subsequently, the signalling and data connections are switched to the new access point 21', i.e. the fixed link 23 (FIG. 2) is switched and the internal CF call references are related to the new Virtual Path 15 (FIG. 3).

Due to the assignment of a single Virtual Path to each mobile terminal which is currently associated with an access point, the handover switching is performed on a Virtual Path basis. The VPI used by the access point corresponds to the RCI that addresses a particular mobile terminal during the current association.

It must be remembered that the present invention contemplates radio cells that are geographically fixed and/or radio cells which are geographically dynamic. Therefore, movement from one radio cell to another does not necessarily mean that the mobile terminal has moved, but merely that the mobile terminal is relocating into another radio cell.

Loss of Connection. After the association of a mobile terminal 22 with an access point 21 has been lost, the control function releases the pending connections and frees the allocated resources. The access point may reassign the RCI to another mobile terminal. Loss of connection may be detected by an alive message mechanism between the access point and the mobile terminal, or between the control function and the mobile terminal. The alive message mechanism is known in the art, and does not need to be further discussed herein.

The dynamic connection mapping of the present invention requires the access point to distinguish cells received from different mobile terminals. The access point's RMAC 31 (FIGS. 6 and 7) has to provide a unique RCI 6 for each associated mobile terminal. As indicated previously, the RCI 6 is derived from the RMAC of the access point 21, and may reflect a channel, slot number, coding key, polling reference, or something similar. Freed RCIs are reused for other mobile terminals. The maximum number of available RCIs, "m", is equal to the maximum number of mobile terminals the may be associated to an access point, and corresponds to the number of Virtual Paths available to that access point.

Preferably, the values of the RCIs correspond directly to the VPI values. For example, they may fall in the range 0. . . 255 if the maximum value for the VPI is 256. Therefore, the number of possible mobile terminals that may be associated at any one time to the access point is limited to the number of available VPIs.

A one-to-one relationship between the mobile terminal's ID 7 (its ATM address), the RCI 6, and the VPI 5, has to be guaranteed for the duration of the mobile terminal's association with an access point.

FIG. 3 illustrates the relationship between identifiers used for the assignment procedure. The messages for registration, handover, and signalling exchanged between mobile terminals and the control function are transferred on one or more reserved Signalling Virtual Channels (SVC) 16. These reserved SVCs use the same Virtual Channel Identifier (VCI) for each Virtual Path. All VCs which are related to a particular mobile terminal are mapped into one Virtual Path. As illustrated in FIG. 3, there are "k" possible Virtual Channels, where "k" depends on the number of unreserved VCIs. Since the Virtual Path information has no meaning for a mobile terminal, the VPI is not necessarily conveyed over the air interface. ATM cells traversing the access point are mapped by the Mapping Unit 34 (FIG. 6) from the RMAC 31 into the Interface Adapter 32, and similarly in the reverse direction.

The VPI value 5 which is derived from the corresponding RCI 6 is assigned to cells forwarded to the control function 20. Cells to be transmitted to the mobile terminals 22 are assigned to the appropriate radio connection based on the VPI. The Mapping Unit 34 includes appropriate numbers of elastic buffers 33 allocated to each mobile terminal and Virtual Path. The buffers store ATM cells prior to forwarding them to the RMAC 31 and Interface Adapter 32, respectively. The elastic buffers 33 are the binding elements between the radio connection 25 to each mobile terminal controlled by the RMAC, and the Virtual Path conveyed by the Interface Adapter 32. Each elastic buffer 33 corresponds to a particular radio connection 25 and a Virtual Path 5.

The elastic buffers allow the present invention to adapt to different and changing transmission speeds on the radio connection 25 and at the fixed link 23 toward the control function. The access point 21 thus is transparent for all Virtual Channels 14, including Signalling Virtual Channels 16.

If the VPI and RCI are not identical, then a table may be used to derive the VPI from the assigned RCI. In the alternative, there may also be, for example, a fixed offset between the two. For example, the RCI may be assigned an address within the range of 1–1000; the derived VPI may be assigned an address value between 20,000–21,000. This example is intended solely to indicate that there must be a fixed interrelation (one-to-one correspondence) between the two address ranges. Obviously, no translation work needs to be done at the access point if the VPI is identical to the RCI.

In the uplink connection (mobile terminal to access point), the ATM header is completed by the VPI. In the downlink (access point to mobile terminal), there is no need for the VPI since the access point knows where the mobile terminal is. The access point may, therefore, remove some bits from the ATM cells in the downlink and add some bits in the uplink.

As can be seen by the above discussion, the present invention provides a mechanism for dynamical connection mapping in wireless ATM systems.

Figure 7:
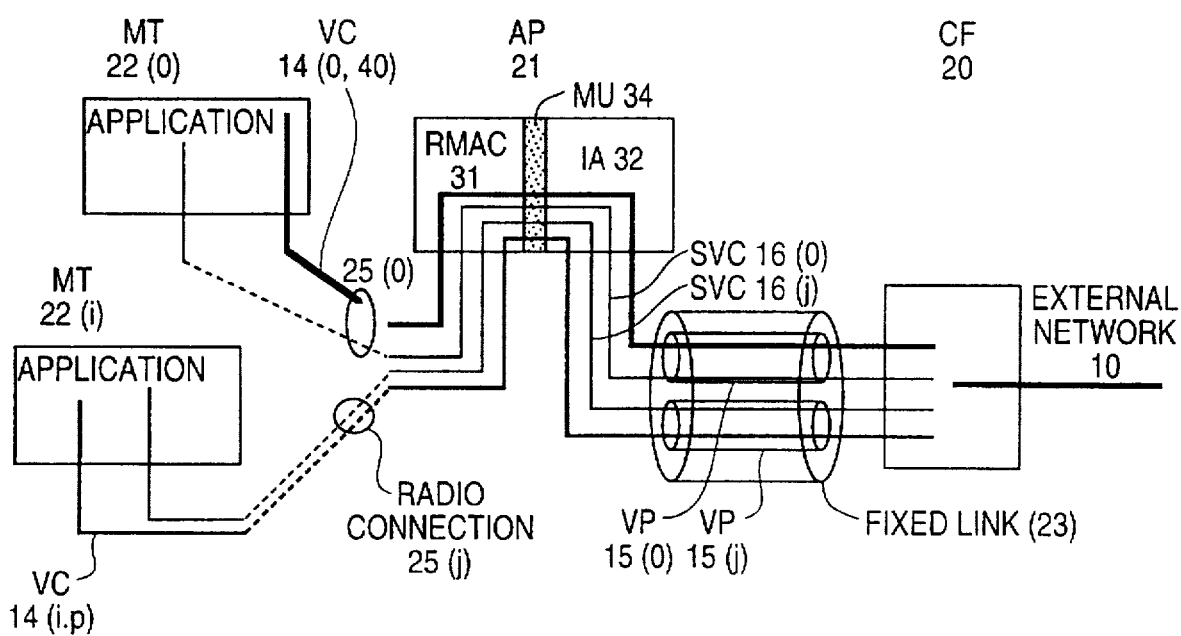
FIG. 7 shows the mapping of connections between the control function and two mobile terminals according to a preferred operation of the present invention.

The basic structure of the system according to one preferred embodiment of the present invention is shown in FIGS. 6 and 7. The control function is connected by preferably fixed links 23 (e.g., hardwired) to access points 21 (only one of which is shown in FIGS. 6 and 7). The access point 21 controls its radio cell so that the control function 20 can communicate with one or more mobile terminals 22(0), 22(1) . . . 22(m−1).

The access point 21 is preferably a radio transceiver having a radio medium access controller RMAC 31, a mapping unit MU 34 having appropriate buffers 33, etc., all (or each) controlled by a controller. This controller, as with all active components contemplated by the present invention or shown in the figures of the present invention (including the system controller), may be implemented through appropriate hardware circuits and/or hardware and software combinations including but not limited to programmed microprocessors. The RMAC may contain capabilities for error correction, transmission power control, receiver sensitivity, etc.

At the mapping unit 34 of access point 21, ATM cells transmitted by the mobile terminals are mapped, without processing, from the RMAC 31 to the Interface Adapter 32 of the fixed link to the control function 20. Similar, but opposite, mapping applies for cells traversing the access point from the CF 20 to the RMAC. The access point 32 is preferably transparent for all connections including signalling.

The mapping unit 34 preferably includes elastic buffers 33 for each communication direction, so as to adapt to different and changing transmission speeds at the wireless side versus at the fixed link side.

As is readily apparent from the present invention, dynamic connection mapping has several advantages. By using an access point AP which is completely transparent for data traffic and control traffic, the AP is simplified thereby yielding low infrastructure costs, high reliability, and low power consumption. The access point is preferably implemented using integrated circuits with appropriate communication interfaces and buffers, as outlined above. The integrated circuits allow for fewer active elements. Finite state machines are also contemplated for implementation of the access points.

The ease of new registration and handover is also apparent. Handover is performed on VPI switching, with no individual VCI translation being necessary.

The maximum number of mobile terminals associated at any one time is only limited to the maximum number of Virtual Path Identifiers. The total number of mobile terminals in the entire network is significantly higher.

Because the Virtual Path Identifier (VPI) is not included in the radio transmission, the radio resources are used more efficiently. Only the Virtual Channel Identifier (VCI) is conveyed. Moreover, no protocol is needed between the access point 21 and the control function 20, or between the access point 21 and a mobile terminal 22, for the exchange of information. This permits easy implementation of the present invention at the controller and at the mobile terminal.

No metasignalling protocol is required between the control function 20 and the mobile terminal 22. This enables the use of standardized Signalling Virtual Channels.

Due to the lower power consumption of the inventive access point, its power could be supplied via the fixed connection to the control function 48. That is, the fixed link to the CF may convey electrical energy over the interconnecting wires, such as coaxial cables. Preferably, data and power share the same communication path; the Interface Adapters in both the access point and the control function would provide filtering functions to allows data signals in the form of signal transitions (e.g., AC) to be separated from the fixed level (e.g., DC) used to supply power to the access points. The electrical energy fed into the fixed link is supplied by the control function CF.

A system implementing the present invention will permit a mobile terminal to communicate over several virtual channels at the same time. For example, different applications (e-mail, www, television, fileload, telephone, etc.) can be simultaneously implemented on different channels.

As an example, there may be 256 virtual paths possible, and each virtual path is further subdivided into 65536 virtual channels. These numbers reflect the address space used: the VPI uses an 8-bit value and the VCI uses a 16-bit value. Both values are part of the address information conveyed in the header of an ATM cell. Not all channels have to be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital communication system providing wireless access to an ATM environment, comprising:

a controller for controlling ATM communications;

a first mobile terminal having a wireless communication interface;

at least one access point covering wireless communications within a geographical area, for facilitating communication between said controller and said first mobile terminal when said first mobile terminal is located within the geographical area, said access point including:
  a wireless access part for establishing a wireless connection with the wireless communication interface of said first mobile terminal,
  an interface part operatively connected to said controller through a respective fixed link, and
  a mapping unit for mapping ATM cells received on the wireless access part into a selected virtual path on the respective fixed link to said controller, and for mapping ATM cells received on the selected virtual path of the respective fixed link into the wireless connection to said first mobile terminal;

a plurality of mobile terminals associated with a first one of said at least one access point through respective wireless connections, the fixed link between said first access point and said controller including a plurality of virtual paths, each virtual path being unique to a respective one of said plurality of mobile terminals; and at least one identical predefined signalling virtual channel within each of the virtual Paths, the identical predefined signalling virtual channels being for use in communicating predetermined information between said controller and said plurality of mobile terminals.

2. The digital communications system of claim 1, wherein the wireless connection between said first mobile terminal and said access point has a unique wireless connection identifier, said system further comprising:

an assignment controller for selecting a virtual path identifier to be assigned to said first mobile terminal, the virtual path identifier directly corresponding to the wireless connection identifier belonging to said first mobile terminal.

3. The digital communications system of claim 2, wherein said mobile terminal is currently associated with a first one of said at least one access point, said assignment controller for selecting a new virtual path identifier to be assigned to said mobile terminal, the new virtual path identifier directly corresponding to a new wireless connection identifier assigned by a second access point when said mobile terminal approaches a portion of the geographical area covered by the second access point.

4. The digital communications system of claim 1, wherein said mobile terminal includes:

a terminal controller for controlling the wireless communication interface to transmit a request for registration to the digital communications system;

said controller assigning the selected virtual path to said mobile terminal in response to the request.

5. The digital communications system of claim 1, wherein said mobile terminal includes a plurality of data connections to said controller, the data connections being transmitted using respective virtual channels within the selected virtual path.

6. The digital communications system of claim 1, said controller including a control part for releasing the selected virtual path of said mobile terminal in response to the disconnection of said mobile terminal from the digital communications system, the released virtual path being made available for future selection for another mobile terminal.

7. The digital communications system of claim 1, said access point further including:

a set of buffers in said mapping unit, for mapping ATM cells from said controller or from said mobile terminal, to the wireless connection or to the selected virtual path on the fixed link;

wherein said interface part provides an interface between said buffers and the fixed link, and said wireless access part provides an interface between said buffers and the wireless connection.

8. The digital communications system of claim 1, further including a plurality of mobile terminals having wireless connections to said access part, the wireless connections being radio connections, said access part further including:

a radio connection identifier assignment part, for assigning respective radio connection identifiers to the radio connections between said plurality of mobile terminals and said access part, the radio connection identifier remaining unchanged for the duration of the respective radio connection.

9. A process for dynamic connection mapping of ATM cells in a digital communications system with a plurality of mobile terminals, comprising the steps of:

(a) providing a wireless ATM connection between at least one of said plurality of mobile terminals and an access point when said at least one mobile terminal is within a geographical region covered by the access point;

(b) providing a fixed ATM connection over a fixed communications link between the access point and a controller;

(c) providing a virtual path for each of said at least one of said plurality of mobile terminals, the virtual path being unique for each of said at least one of said plurality of mobile terminals;

(d) providing at least one predefined signalling virtual channel within each virtual path, the predefined signalling virtual channels being for use in communicating information of a predetermined type between controller and said plurality of mobile terminals in the access point;

(e) mapping the ATM cells received on the wireless ATM connection into a first selected virtual path on the fixed ATM connection; and (f) mapping the ATM cells received on the first selected virtual path of the fixed ATM connection into the wireless ATM connection.

10. The process of claim 9 further comprising the steps of:

(g) assigning a connection identifier to the wireless ATM connection; and (h) selecting the first selected virtual path based upon the connection identifier;

wherein the ATM cells received on the wireless ATM connection include the connection identifier.

11. The process of claim 10, wherein the mapping of said step (e) includes the substep of:

inserting, by the access point, the identifier of the first selected virtual path in the ATM cells mapped to the fixed ATM connection.

12. The process of claim 10, wherein the ATM cells received by the access point from the fixed ATM connection include an identifier of the first selected virtual path, the mapping of said step (f) including the substeps of:

(f1) translating the identifier of the first selected virtual path into the connection identifier, and (f2) removing, by the access point, the identifier of the first selected virtual path from in the ATM cells mapped to the wireless ATM connection.

13. The process of claim 10, further comprising the steps of:

(i) assigning a new connection identifier to the mobile terminal when the first mobile terminal becomes associated with a new access point; and (j) selecting a new selected virtual path for the first mobile terminal based upon the new connection identifier.

14. The process of claim 13, wherein said steps (i) and (j) are performed in response to the step of:

(k) transmitting a handover request from the first mobile terminal when the first mobile terminal approaches the geographical area covered by the second access point.

* * * * *